(12) United States Patent
Winterberg et al.

(10) Patent No.: US 11,513,807 B1
(45) Date of Patent: Nov. 29, 2022

(54) TEMPERATURE BASED DECISION FEEDBACK EQUALIZATION RETRAINING

(71) Applicant: DELL PRODUCTS, LP, Round Rock, TX (US)

(72) Inventors: Doug S. Winterberg, Austin, TX (US); Wan-Ju Kuo, Xindian District (TW); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/386,799

(22) Filed: Jul. 28, 2021

(51) Int. Cl.
| | |
|---|---|
| *G06F 11/00* | (2006.01) |
| *G06F 9/4401* | (2018.01) |
| *G06F 11/22* | (2006.01) |
| *H04L 25/03* | (2006.01) |
| *G06F 11/14* | (2006.01) |

(52) U.S. Cl.
CPC ........ *G06F 9/4401* (2013.01); *G06F 11/2284* (2013.01); *H04L 25/03057* (2013.01); *G06F 11/1417* (2013.01)

(58) Field of Classification Search
CPC .......................... G06F 11/2284; G06F 11/1417
USPC ........................................................ 714/1–57
See application file for complete search history.

(56) References Cited

U.S. PATENT DOCUMENTS

| | | | | |
|---|---|---|---|---|
| 11,423,303 | B1* | 8/2022 | Jiao | .......................... G06N 3/08 |
| 2017/0285683 | A1* | 10/2017 | Lin | ..................... G06F 13/4022 |
| 2020/0035321 | A1 | 1/2020 | Berke et al. | |
| 2020/0076652 | A1* | 3/2020 | Shi | ...................... G06F 13/1689 |
| 2021/0117206 | A1 | 4/2021 | Shutt et al. | |

* cited by examiner

*Primary Examiner* — Sarai E Butler
(74) *Attorney, Agent, or Firm* — Larson Newman, LLP

(57) ABSTRACT

An information handling system includes a memory subsystem and a basic/input out system (BIOS). The BIOS performs multiple trainings of the memory subsystem, and each of the trainings is performed at a different temperature. The BIOS stores multiple derating values in a derating table of the BIOS, and each of the derating values corresponds to a respective tap value at a respective temperature. During a subsequent power on self test of the information handling system, the BIOS performs a first training of the memory subsystem, and stores a first set of tap values. During a runtime of the information handling system, a memory controller determines whether a temperature of the information handling system has changed by a predetermined amount. In response to the temperature changing by the predetermined amount, the memory controller utilizes the derating values in the derating table to automatically update the tap values.

20 Claims, 3 Drawing Sheets

TEMPERATURE BASED DECISION FEEDBACK EQUALIZATION RETRAINING

FIELD OF THE DISCLOSURE

The present disclosure generally relates to temperature based decision feedback equalization retraining in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory subsystem and a basic/input out system (BIOS). The memory subsystem includes a plurality of dual-inline memory modules, a memory channel, and a memory controller of a processor. The BIOS may perform multiple trainings of the memory subsystem, and each of the trainings is performed at a different temperature. The BIOS may store multiple derating values in a derating table of the BIOS, and each of the derating values corresponds to a respective tap value at a respective temperature. During a subsequent power on self test of the information handling system, the BIOS may perform a first training of the memory subsystem, and store a first set of tap values. During a runtime of the information handling system, a memory controller may determine whether a temperature of the information handling system has changed by a predetermined amount. In response to the temperature changing by the predetermined amount, the memory controller may utilize the derating values in the derating table to automatically update the tap values.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
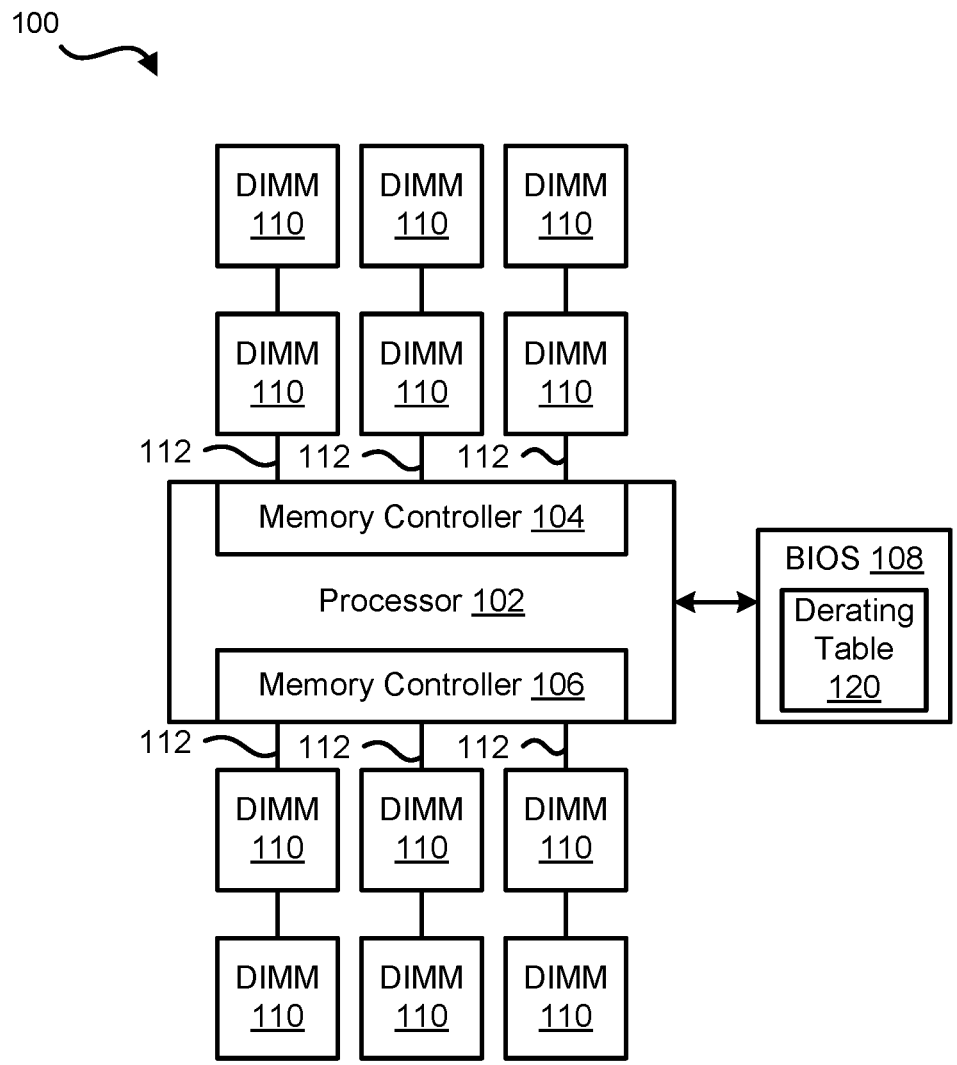
FIG. 1 is a diagram of a portion of an information handling system according to at least one embodiment of the present disclosure.

FIG. 1 illustrates an information handling system 100 including a processor 102, a memory controllers 104 and 106, a Basic Input/Output System (BIOS) 108, and dual inline memory modules (DIMMs) 110. Memory controller 104 and a set of DIMMs 110 are coupled together via memory channels 112, and memory controller 106 and another set of DIMMs 110 are coupled together via additional memory channels 112. BIOS 108 may store a derating table 220. Hereinafter, memory controllers 104 and 106, DIMMs 110, and memory channels 112 may be referred to as the memory subsystem. Memory controllers 104 and 106 may represent a portion of information handling system 100 that operates to manage the flow of information to the main memory of the information handling system, represented by DIMMs 110.

Memory controllers 104 and 106 and DIMMs 110 operate in accordance with a particular memory architecture implemented on information handling system 100. For example, memory controllers 104 and 106 and DIMM 110 may operate in accordance with a Double-Data Rate (DDR) standard, such as a JEDEC DDR4 or DDR5 standard. It will be understood that, where memory controllers 104 and 106 and DIMMs 110 operate in accordance with different DDR standards, such as DDR3, DDR4, and DDR5 standards, then the memory controllers and DIMMs will be configured to provide different numbers of separate memory channels as compared to FIG. 1 without varying from the scope of this disclosure.

Memory channels 112 may include a command/address/control bus (CMD/ADR), a clock (CLK) for timing of the signals on the CMD/ADR bus, a data bus (DQ), and a data strobe (DQS) for of the signals on the DQ bus. When information handling system 100 is powered up, for example during a Power-On Self Test (POST) of a system boot process performed by BIOS 108 or Universal Extensible Firmware Interface (UEFI) of the information handling system, the information handling system performs several predefined procedures to ensure that the memory subsystem is configured to provide an optimal level of data transmission reliability and to ensure the highest possible operational bandwidth.

In an example, these predefined procedures may include training communication lanes of each DIMM 110. In certain examples, each DIMM 110 may consist of 80 lanes for data communication. Based on the ever increasing number of DIMMs 110 supported by memory controllers 104 and 106 of processor 102, an amount of time consumed by training may continue to increase. DDR speeds continue to increase with speeds up to 6.4 or 8 Gbps, which in turn may result in equalization being a part of memory controllers 104 and 106 and DIMMs 110. However, training of memory channels 112 may increase in complexity to achieve a desired equalization. As the speed and number of equalization tabs increase, the complexity of the training also increases.

Decision feedback equalization (DFE) is a technique utilized during training to correct high speed serial link intersymbol interference (ISI). DFE may be utilized to generate equalization values to correct high speed serial link ISI problems. Small variations in DFE values may result in huge variations in the results. Thus, a small variation may result in a huge variation of the eye. Based on these conditions, as the number of DIMMs 110 continue to increase, more time may be needed for DDR training and the additional training time may result in larger delays before real data may be transmitted on memory channels 112. Information handling system 100 may be improved by reducing the number of trainings needed in the memory subsystem while maintaining a desired eye of the DFE values.

After training the memory subsystem of memory controllers 104 and 106 and DIMMs 110, processor 102 may utilize the memory controllers to transfer data to and from DIMMs 110 via memory channels 112. In an example, a temperature of information handling system 100 may increase as processor 102 and other components perform various operations. Changes in temperature, up or down, may result in the behavior of DIMMs 110 silicon and the behavior of memory channels 112. In certain examples, any suitable amount of temperature change, such as ten or twenty degrees, may cause behavior changes in DIMMs 110 and memory channels 112, which in turn may result in suboptimal DFE taps. In these situations, the memory subsystem may need to be retrained to create an optimal DFE. Information handling system 100 may be improved by automatically rescaling DFE tap values without retraining when the temperature changes by a predetermined amount as will be described herein.

During an initial training of the memory subsystem in information handling system 100, the training may be performed multiple times and each of the trainings may be performed at different temperatures. For example, a first training may be performed at a first temperature of information handling system 100. In response to the training being completed, the DFE tap values calculated during the training are stored in derating table 120. In an example, the derating values associated with the different tap values may also be stored in derating table 120. For example, the derating values for the different DFE tap values at a nominal temperature may all be one.

In an example, the temperature of information handling system 100 may be changed by a predetermined amount and the memory subsystem may be retrained at the new temperature. In response to the training of the memory subsystem being completed at the new temperature, the DFE tap values and the different derating values associated with the different tap values may be stored in derating table 120. In certain examples, a derating value for a DFE tap value may be a percentage change from the DFE tap value at the nominal temperature. For example, if the temperature was lowered by the predetermined amount, the derating value for DFE tap 1 may be 0.7 or 70%, the derating value for the DFE tap 2 may still be 1 or 100%, the derating value for the DFE tap 3 may be 0.9 or 90%, and the derating value for DFE tap 4 may still be 1 or 100%.

In response to the training of the memory subsystem being completed at another temperature, the DFE tap values and the different derating values associated with the different tap values may be stored in derating table 120. For example, if the temperature was increased by the predetermined amount, the derating value for DFE tap 1 may be 1.4 or 140%, the derating value for the DFE tap 2 may still be 1 or 100%, the derating value for the DFE tap 3 may be 1.1 or 110%, and the derating value for DFE tap 4 may still be 1 or 100%. In an example, a derating value of 1 may indicate that no substantial change was detected for the DFE tap as compared to training at the nominal temperature, a derating value less than 1 may indicate that the DFE value reduced as compared to training at the nominal temperature, and a derating value greater than 1 may indicate that the DFE value increased as compared to training at the nominal temperature.

In certain examples, BIOS 108 may perform the temperature variation trainings with different data transmission speeds, and may store multiple derating tables 120 that are each associated with a different data transmission speed along memory channels 112. In an example, the BIOS 108 may perform the different temperature trainings at any suitable level of granularity including, but not limited to, an average of all DIMMs 110, a DIMM by DIMM level, and a DRAM by DRAM level. BIOS 108 may then store multiple derating tables 120 and each derating table may be associated with a different level of granularity.

In response to the multiple temperature DDR trainings being performed for information handling system 100, BIOS 108 may perform an initial training for the memory subsystem during a boot of the information handling system. In response to the initial training, BIOS 108 may store the DFE tap values in a memory and the DFE values may be set as the values for a nominal temperature of information handling system 100. After the training is complete and the DFE tap values have been stored, information handling system 100 may transmit data to DIMMs 110 via memory channel 112 according to the values determined during the training.

During operation, any suitable component of information handling system 100 may monitor the temperature of DIMMs 110 and memory channel 112. The temperature monitoring component may be a monitoring circuit on DIMMs 110, a monitoring circuit within a predetermined proximity to the DIMMs and memory channels 112, or the like. In response to a temperature change being sensed, memory controllers 104 and 106 may access derating table 120 to determine whether any DFE tap values should be adjusted based on the detected temperature change.

In an example, the DFE values may be automatically adjusted based on the corresponding derating values in derating table 120. For example, each DFE tap value may be multiplied by its corresponding derating value in derating table 120, and the resulting values may be utilized as the new tap values. The new tap values may be stored for the DIMMs 110 and memory channel 112. The channel equalization may be improved based on the updated tap values, such that the DDR training may converge closer to the optimal value of equalization as compared to the previous tap values. In an example, the updated tap values that were calculated from derating table 120 may improve the equalization in a shorter amount of time as compared to retraining DIMMs 110 and memory channels 112.

In certain examples, upon the DFE tap values being updated, a determination may be made whether the new values corrected the previous errors or issues with DIMMs 110 and memory channels 112. If so, information handling system 100 may continue to operate with the new tap values, and may automatically change or update the DFE tap values in response to another detected temperature change. If updated values do not correct the equalization errors, retraining of the memory subsystem may be performed in any suitable manner. In an example, the retraining granularity of the training may include, but is not limited to, all DIMMs 110 and only the DIMM or DIMMs with detected issues.

Figure 2:
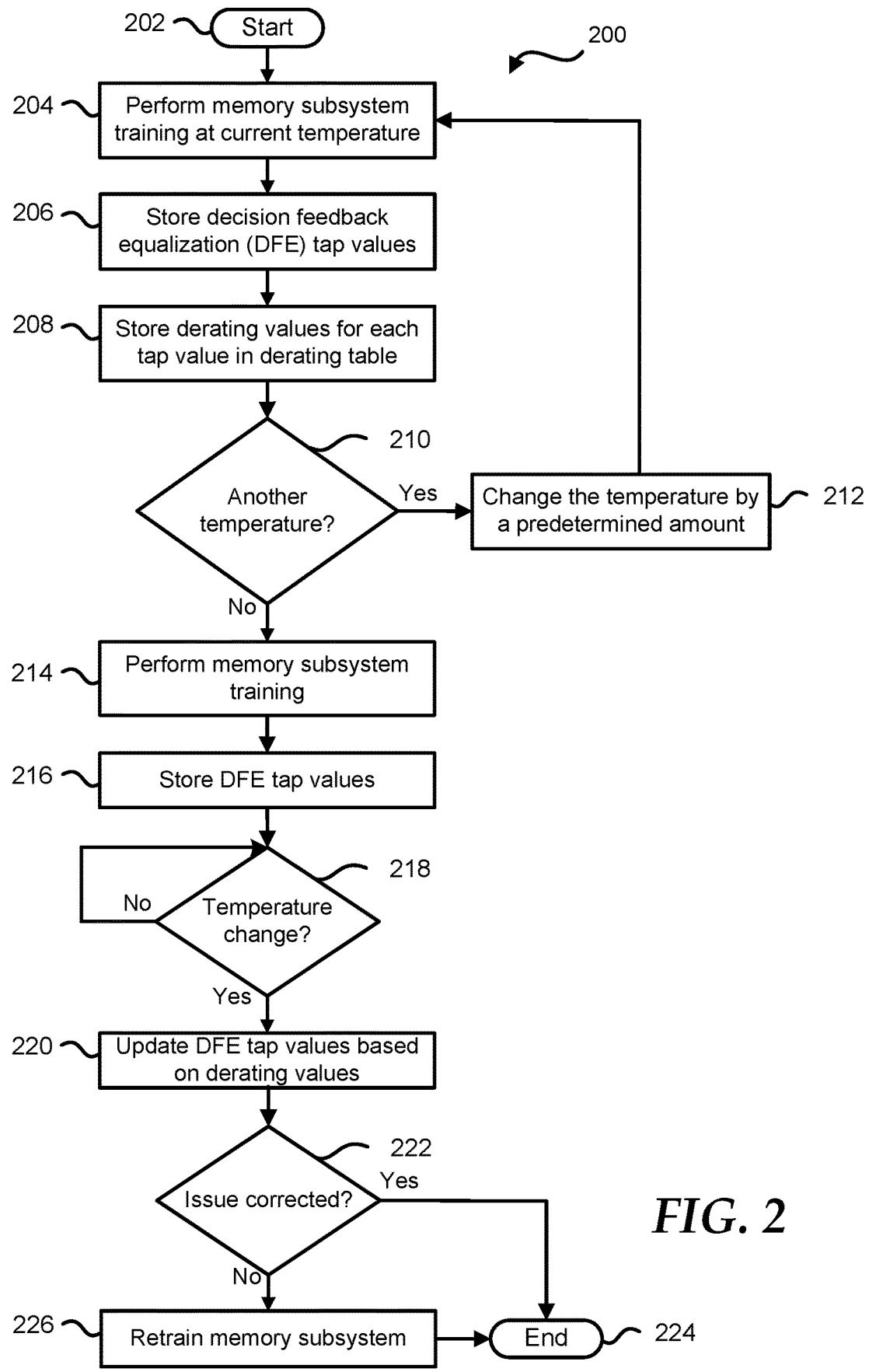
FIG. 2 is a flow diagram of a method for automatically updating decision-feedback equalization values based on a temperature change according to at least one embodiment of the present disclosure.

FIG. 2 illustrates a flow diagram of a method 200 for automatically updating decision-feedback equalization values based on a temperature change according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, by processor 102 and memory controllers 104 and 106 of FIG. 1, or any other type of system, controller, device, module, processor, or any combination thereof, operable to employ all, or portions of, the method of FIG. 2.

At block 204, a memory subsystem training is performed at a current temperature of an information handling system. In an example, the memory subsystem may include, but is not limited to, memory controllers, DIMMs, and memory channels in the information handling system. In certain examples, the training may include a DDR training, which in turn may include DFE operations.

At block 206, DFE tap values calculated during the training are stored. In an example, the DFE tap values may be stored by in a basic input/output device (BIOS) in any suitable memory location, such as a derating table. At block 208, a derating value is stored for each corresponding DFE tap value. In an example, each DFE tap value may have a corresponding derating value of one when the current temperature is a nominal or starting temperature. The derating value may varying, either up or down, from one for one or more DFE tap values when a current temperature of information handling system is varied by a predetermined amount from the starting or nominal temperature.

At block 210, a determination is made whether training will be performed at another temperature. If so, the temperature of the information handling system is changed by a predetermined amount at block 212 and the flow continues as stated above at block 204. If there is not another temperature for training, the information handling system may perform a POST and the memory subsystem may be trained at any current operating temperature at block 214. At block 216, DFE tap values are stored in BIOS. In an example, the DFE tap values may be associated with an optimal equalization determined during the DDR training of POST.

At block 218, a determination is made whether the temperature of information handling system has changed by a predetermined amount. In an example, the predetermined amount may be any suitable amount including, but not limited to, ten degrees and twenty degrees. In certain examples, the temperature may be detected in any suitable location of the information handling system, such as in a location proximate to memory channels of the memory subsystem, within one or more DIMMs, or the like.

In response to the temperature changing by the predetermined amount, the DFE tap values are updated based on corresponding derating values in the derating table at block 220. In an example, the corresponding derating value may be selected based on the temperature change, such as an amount, an increase, or a decrease, and an identified tap. In certain examples, the tap values may be updated based on the corresponding derating value without retraining the memory subsystem.

At block 222, a determination is made whether the updated tap values corrected the issue of the memory subsystem. If the issue has been corrected, the flow ends at block 224. If the issue has not been corrected, the memory subsystem is retrained at block 226 and the flow ends at block 224. In an example, the retraining of the memory subsystem may be performed on any suitable granularity level including, but not limited to, all DIMMs in the memory subsystem and only those DIMMs experiencing the issue.

Figure 3:
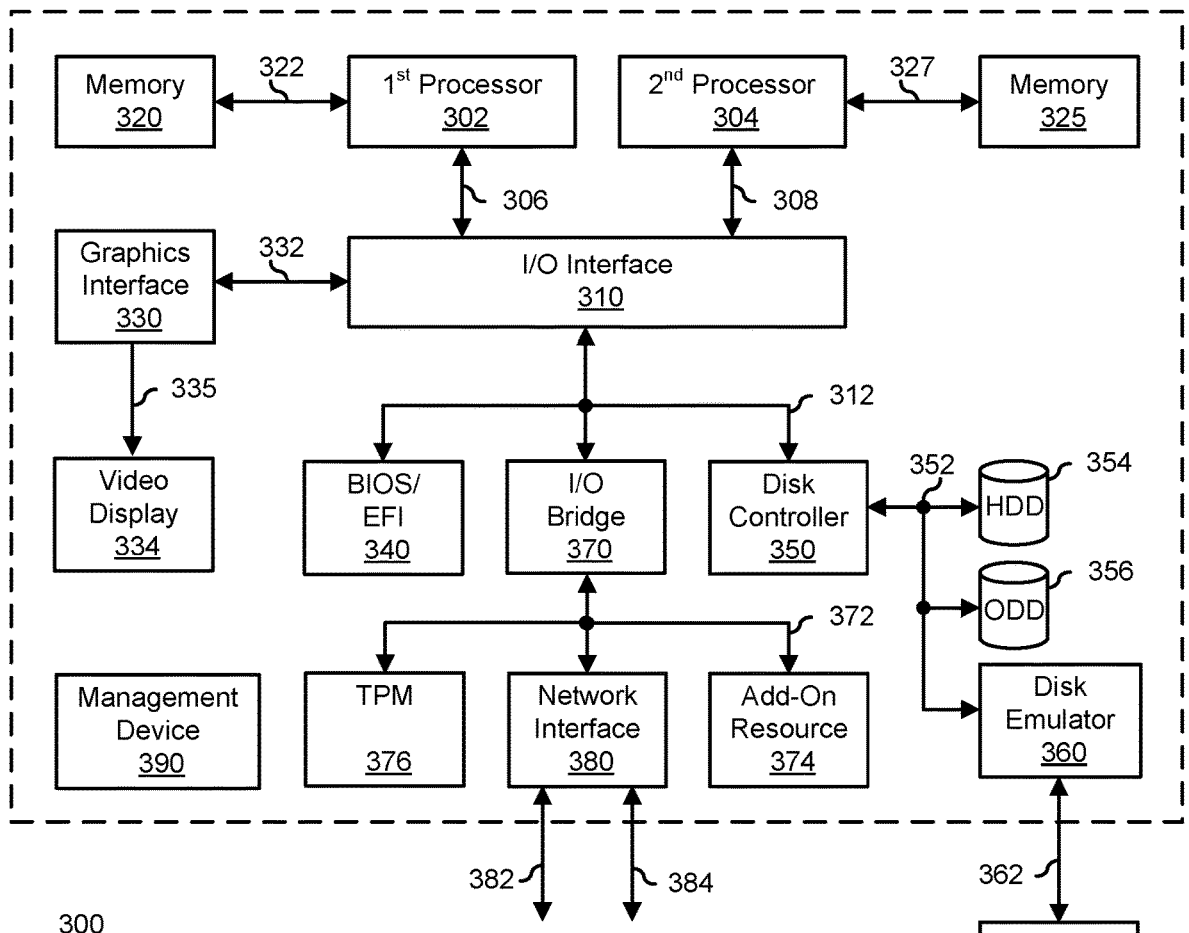
FIG. 3 is a block diagram of a general information handling system according to an embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, and a management device 390. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising: a memory subsystem including a plurality of dual-inline memory modules, a memory channel, and a memory controller of a processor; and a basic input/output system (BIOS) to communicate with the memory subsystem, the BIOS to: perform a plurality of trainings of the memory subsystem, wherein each of the trainings is performed at a different temperature; store a plurality of derating values in a derating table of the BIOS, wherein each of the derating values corresponds to a respective tap value at a respective temperature; and during a subsequent power on self test of the information handling system, the BIOS to: perform a first training of the memory subsystem; and store a first set of tap values, and during a runtime of the information handling system, the memory controller to: determine whether a temperature of the information handling system has changed by a predetermined amount; and in response to the temperature changing by the predetermined amount, to automatically update the first set of tap values based on the derating values in the derating table.

2. The information handling system of claim 1, wherein during the runtime, the first set of tap values are updated without the BIOS retraining the memory subsystem.

3. The information handling system of claim 1, wherein in response to the first set of tap values being updated, the memory controller further to: determine whether an issue with the memory subsystem is resolved based on the updated first set of tap values; and in response to the issue not being resolved, the BIOS to retrain the memory subsystem.

4. The information handling system of claim 3, wherein the retraining of the memory subsystem includes the BIOS further to:
   retrain all of the dual-inline memory modules in the memory subsystem.

5. The information handling system of claim 3, wherein the retraining of the memory subsystem includes the BIOS further to:
   retrain only the dual-inline memory modules that have the issue in the memory subsystem.

6. The information handling system of claim 1, wherein the first set of tap values are decision feedback equalization tap values.

7. The information handling system of claim 1, wherein the derating values are a percentage change of the first set of tap values based on the change in the temperature.

8. A method comprising: performing, via a basic input/output system (BIOS) of an information handling system, a plurality of trainings of the memory subsystem, wherein each of the trainings is performed at a different temperature; storing a plurality of derating values in a derating table of the BIOS, wherein each of the derating values corresponds to a respective tap value at a respective temperature; during a subsequent power on self test of the information handling system: performing a first training of the memory subsystem; and storing a first set of tap values; during a runtime of the information handling system, determining by a memory controller of the memory subsystem, whether a temperature of the information handling system has changed by a predetermined amount; and in response to the temperature changing by the predetermined amount, automatically updating the first set of tap values based on the derating values in the derating table.

9. The method of claim 8, wherein during the runtime, the first set of tap values are updated without the BIOS retraining the memory subsystem.

10. The method of claim 8, wherein in response to the first set of tap values being updated, the method further comprises: determining whether an issue with the memory subsystem is resolved based on the updated first set of tap values; and in response to the issue not being resolved, retraining the memory subsystem.

11. The method of claim 10, wherein the retraining of the memory subsystem, the method further comprises:
   retraining all of dual-inline memory modules in the memory subsystem.

12. The method of claim 10, wherein the retraining of the memory subsystem, the method further comprises:
   retraining only the dual-inline memory modules that have the issue in the memory subsystem.

13. The method of claim 8, wherein the first set of tap values are decision feedback equalization tap values.

14. The method of claim 8, wherein the derating values are a percentage change of the first set of tap values based on the change in the temperature.

15. The method of claim 8, wherein the memory subsystem includes a plurality of dual-inline memory modules, a memory channel, and a memory controller of a processor.

16. A method comprising: performing, via a basic input/output system (BIOS) of an information handling system, a plurality of trainings of a memory subsystem, wherein each of the trainings is performed at a different temperature; storing a plurality of derating values in a derating table of the BIOS, wherein each of the derating values corresponds to a respective decision feedback equalization tap value at a respective temperature; during a subsequent power on self test of the information handling system: performing a first training of the memory subsystem; and storing a first set of decision feedback equalization tap values; during a runtime of the information handling system, automatically updating the first set of decision feedback equalization tap values based on the derating values in the derating table without the BIOS retraining the memory subsystem if a temperature of the information handling system has changed by a predetermined amount.

17. The method of claim 16, wherein in response to the decision feedback equalization tap values being updated, the method further comprises: determining whether an issue with the memory subsystem is resolved based on the updated decision feedback equalization tap values; and in response to the issue not being resolved, retraining the memory subsystem.

18. The method of claim 17, wherein the retraining of the memory subsystem, the method further comprises:
   retraining all of dual-inline memory modules in the memory subsystem.

19. The method of claim 17, wherein the retraining of the memory subsystem, the method further comprises:
   retraining only the dual-inline memory modules that have the issue in the memory subsystem.

20. The method of claim 16, wherein the derating values are a percentage change of the decision feedback equalization tap values based on the change in the temperature.

* * * * *